United States Patent [19]

Omure et al.

[11] Patent Number: 5,087,386
[45] Date of Patent: Feb. 11, 1992

[54] FLUORINE-CONTAINING ALCOHOL-BASED DEHYDRATING AGENT AND METHOD OF DRYING ARTICLES

[75] Inventors: Yukio Omure, Takatsuki; Masahiro Noguchi, Moriguchi; Naoyoshi Hanatani, Settsu, all of Japan

[73] Assignee: Daikin Industries, Ltd., Osaka, Japan

[21] Appl. No.: 536,890

[22] Filed: Jun. 12, 1990

[30] Foreign Application Priority Data

Jun. 19, 1989 [JP] Japan ................... 1-156403

[51] Int. Cl.⁵ .............................................. C09K 3/18
[52] U.S. Cl. ..................... 252/154; 252/364; 252/DIG. 9; 252/171
[58] Field of Search ............ 252/194 APS, 364 APS, 252/DIG. 9, 171

[56] References Cited

U.S. PATENT DOCUMENTS 3,509,061 4/1970 Zisman et asl. .............. 252/364
4,465,610 8/1984 Enjo et al. ................... 252/171
4,578,209 5/1986 Hisamoto et al. ............ 252/171
4,770,714 9/1988 Buchwald et al. ........... 252/162

FOREIGN PATENT DOCUMENTS 039192 10/1980 Japan.
032517 10/1984 Japan.
308826 7/1988 Japan.

Primary Examiner—Deborah L. Kyle
Assistant Examiner—Valerie D. Fee
Attorney, Agent, or Firm—Larson and Taylor

[57] ABSTRACT

The invention provides a dehydrating agent comprising at least one of fluorine-containing alcohols; a dehydrating agent comprising at least one of fluorine-containing alcohols and water; and a method of dehydrating and drying an article having a surface moistened with residual water, the method comprising immersing the article in a dehydrating agent comprising at least one of fluorine-containing alcohols or comprising at least one of fluorine-containing alcohols and water, and drying the article after the immersion.

2 Claims, 1 Drawing Sheet

FLUORINE-CONTAINING ALCOHOL-BASED DEHYDRATING AGENT AND METHOD OF DRYING ARTICLES

The present invention relates to a fluorine-containing alcohol-based dehydrating agent and a method of drying articles by dehydration using the dehydrating agent.

In the present specification, "percentages" are all by weight.

In many cases, silicon wafers for production of semiconductors, plated articles, optical lenses, various metal parts and the like (hereinafter briefly referred to as "articles") are washed with water in the last stage or in a stage near the last stage of processing. The moisture remaining on the surfaces of these articles will cause the formation of stain-like spots and the occurrence of rust to exert a great influence on the performance of the articles.

The dehydrating agents which have been heretofore widely used for effectively dehydrating the above-mentioned articles are isopropanol, ethanol and like alcohols, trichlorotrifluoroethane and like chlorofluorohydrocarbons (hereinafter referred to as "CFCs") and the compositions prepared by mixing with, or by adding to, a CFC an alcohol, a surfactant and the like.

However, isopropanol and ethanol which are highly flammable have the problem of entailing fire hazards in handling. CFC-based dehydrating agents are free of such problem. In recent years, however, it has been suggested that some kinds of CFCs, when released into the atmosphere, would deplete the stratospheric ozone layer, thereby inflicting a serious adverse influence on the ecosystem including humans on the earth. In view of this, a worldwide agreement has placed a restriction on consumption and production of the major ozone-depleting CFCs.

It is an object of the present invention to provide a novel dehydrating agent which is incombustible or non-flammable and which can substitute for CFC-based dehydrating agents used presently in large quantities.

Other objects and features of the invention will become apparent from the following description.

The present invention provides the following dehydrating agents and a method of dehydrating articles:
(1) a dehydrating agent comprising a fluorine-containing alcohol,
(2) a dehydrating agent comprising a fluorine-containing alcohol and water, and
(3) a method of dehydrating and drying an article having a surface moistened with residual water, the method comprising immersing the article in a dehydrating agent comprising a fluorine-containing alcohol or a fluorine-containing alcohol and water, and drying the article after the immersion.

According to the extensive research conducted by the present inventors, it has been revealed that a composition comprising a fluorine-containing alcohol alone or in combination with water is outstanding in the properties required of dehydrating agents useful for dehydrating articles. The present invention has been accomplished based on this novel finding.

Usable as the fluorine-containing alcohol in the present invention is an alcohol having at least two fluorine atoms and at least two carbon atoms, per molecule. More specifically, examples of such fluorine-containing alcohol are as follows.

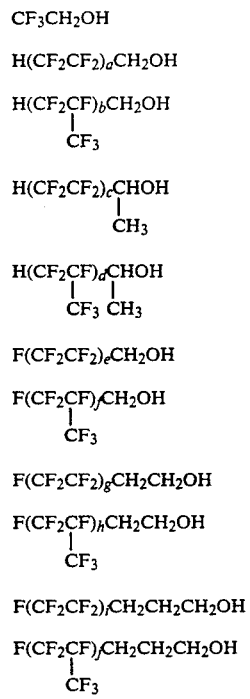

In the above formulae, a, c, e, g and i each represent an integer in the range of 1 to 5, and b, d, f, h and j each represent an integer in the range of 1 to 3.

Among these fluorine-containing alcohols, trifluoroethanol (hereinafter referred to as "3FE", boiling point of 77° C.), tetrafluoropropanol (hereinafter referred to as "4FP", boiling point of 107° C.) and pentafluoropropanol (hereinafter called "5FP", boiling point of 81° C.) are preferable. More preferable is 5FP which is incombustible. These fluorine-containing alcohols can be used singly or at least two of them are usable in mixture.

When the dehydrating agent of the invention is used in the form of a composition formed from a fluorine-containing alcohol and water, the composition may contain water in an amount of about 20%, preferably about 10%, of the amount of the composition. The use of a dehydrating agent formed from a mixture having a water content of up to 10% can achieve an effective replacement, with water present on the surface of the article. However, with the increasing water content of more than 10%, the dehydration agent used is deteriorated in the ability to achieve the replacement. Use of a dehydrating agent having a water content in excess of 20% fails to produce the desired effect. A mixture of 4FP and water (4FP/water=72.5/27.5) and a mixture of 5FP and water (5FP/water=94/6) both form azeotropic compositions and are therefore useful for effectively removing water. A mixture of 3FE and water is not an azeotropic composition but behaves as a composition similar to azeotropic composition.

The dehydrating agent of the present invention may further contain a small quantity of a known stabilizer when so required.

The dehydration and drying of articles using the dehydrating agent of the invention can be conducted in the same manner and with use of the same apparatus as in the method of dehydrating and drying articles using a CFC-based dehydrating agent or like known dehydrating agent. For this reason, the method and apparatus for dehydration are not specifically limited. An example thereof is schematically shown below in FIG. 1.

Figure 1:
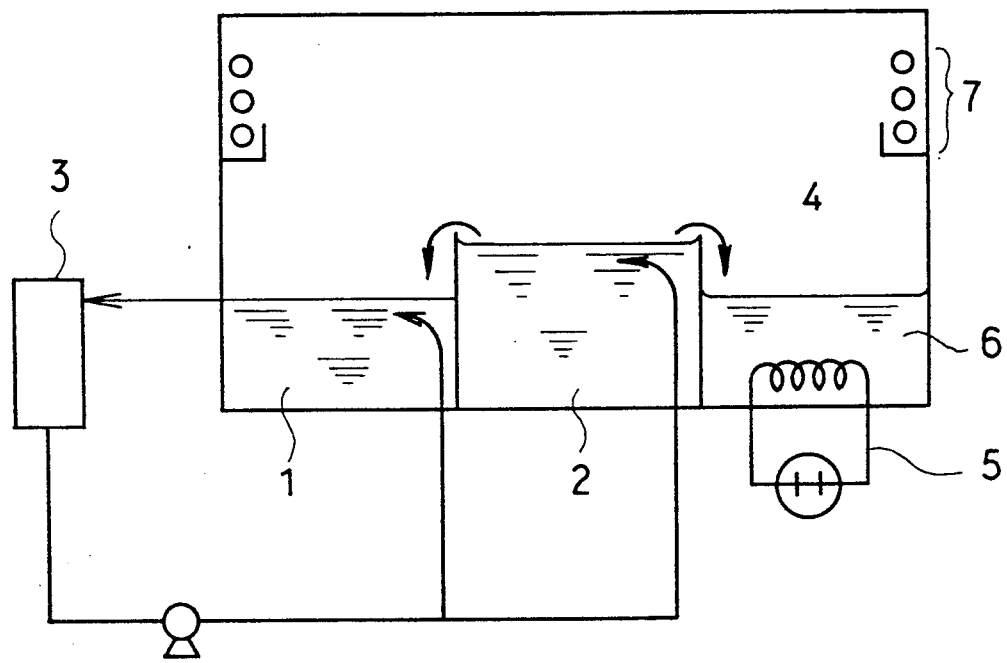
In FIG. 1 which is a view in section showing an example of the apparatus for dehydration to be used in the method of the invention, an article (not shown) having a surface moistened with residual water is immersed in the dehydrating agent of the invention stored in the first sink 1 in which water is replaced with the fluorine-containing alcohol (In the following procedure, 5FP is used as such alcohol unless otherwise specified.) to dehydrate the article.

In order to achieve a higher degree of dehydration of the article, the article treated by the immersion in the first sink 1 is fed to the second sink 2 in which the article was further immersed in the dehydrating agent of the invention. Since a dehydrating agent which is discharged from the first sink 1 and which substantially consists of 5FP alone with water present therein eliminated with use of a water separator 3 is fed to the second sink 2, a higher degree of dehydration level can be achieved.

When it is necessary to further dehydrate the article to a greater extent, the article obtained after completion of the immersion in the second sink 2 is fed to vapor zone 4 above a sump 6 containing vaporized 5FP and provided with heating means 5 to bring the article into contact with the vapor of 5FP, whereby the dehydration of the article is further continued. Cooling pipes 7 which are provided above the vapor zone 4 condense the vapor of 5FP rising from the vapor zone and serve to return 5FP to the sump 6.

The water separator 3 is not limited to a specific type and can be any of those capable of separating water from fluorine-containing alcohol. For example, when 5FP is used as a fluorine-containing alcohol, 5FP can be separated from water by utilizing the phenomenon that 5FP and water are readily separable at low temperatures up to about 15° C. due to the difference in the solubility therebetween. Alternatively, the fluorine-containing alcohol and water can be separated by rectification. Further, the separation can be conducted by utilizing a technique for removing water using a specific membrane.

Although FIG. 1 shows an example of dehydration of an article with use of an apparatus provided with two sinks and one sump, apparatuses useful in the present invention are not limited to this type. More specifically, the structure of the apparatus to be used is variable depending on the amount of residual water with which the surface of the article is moistened, the desired degree of dehydration of the article, degree of facility in dehydration of the article, etc. For example, usable apparatus may be provided with a single sink or sump, or provided with one sink and one sump. Moreover, dehydration can be performed also by spraying.

The dehydration agent of the present invention is free of the problems of environmental disruption such as depletion of ozone layer and the like.

Further, the dehydration agent of the invention has an excellent ability to remove residual water with which the surface of an article is moistened.

Moreover, the use of 5FP as a fluorine-containing alcohol is particularly advantageous to handle because the dehydrating agent is made incombustible. The use of 3FE or 4FP is also very safe since these alcohols need a large quantity of energy to ignite and discharge small quantity of heat in combustion as compared with known dehydrating agents such as isopropanol, ethanol and the like.

In comparison with isopropanol, ethanol and the like, the dehydrating agent of the invention can be readily separated from water when cooled to a low temperature.

In addition, the solvent of the invention which is formed with azeotropic compositions or those similar to azeotropic composition is easy to control and, as a matter of course, entails little or no change in the ratio of the components used even when vaporized and condensed repeatedly for the purpose of recovery and repetitive use thereof.

Given below are examples to clarify the features of the present invention in more detail.

EXAMPLE 1

A glass specimen (size: 50 mm × 50 mm × 5 mm) thoroughly washed beforehand and moistened with water was immersed in each of the dehydrating agents as shown below in Table 1 for a predetermined period of time, was placed into a dry Buchner funnel and was washed with a specific quantity of absolute methanol. The absolute methanol used was collected and analyzed by Karl Fischer's method to determine the amount of water therein. The amount of the water was taken as "A".

The same procedure as above was repeated with the exception of not immersing the glass specimen in the dehydrating agent and not drying the specimen to determine the amount of water in the absolute methanol used. The amount of the water was taken as "B".

Dehydration rate C (%) was determined according to the following equation.

$$C = (B-A)/B \times 100(\%)$$

Table 2 below shows the results.

The above procedures were all carried out at room temperature.

TABLE 1

| Dehydrating agent No. | Composition (%) |
|---|---|
| 1 | 3FE |
| 2 | 3FE/Water = 97/3 |
| 3 | 4FP |
| 4 | 4FP/Water = 72.5/27.5 (azeotropic) |
| 5 | 5FP |
| 6 | 5FP/Water = 94/6 (azeotropic) |
| 7 | IPA |
| 8 | Ethanol |

TABLE 2

| Dehydrating agent No. | 5 sec | 10 sec | 15 sec | 20 sec |
|---|---|---|---|---|
| 1 | 91 | 93 | 95 | 98 |
| 2 | 88 | 91 | 94 | 96 |
| 3 | 90 | 92 | 95 | 97 |
| 4 | 82 | 84 | 87 | 89 |
| 5 | 90 | 93 | 96 | 98 |
| 6 | 88 | 90 | 93 | 94 |
| 7 | 86 | 88 | 90 | 92 |
| 8 | 86 | 89 | 91 | 93 |

The dehydration test was conducted in the same manner as above with the exception of using a ceramic test piece. Table 3 below shows the results.

TABLE 3

| Dehydrating agent No. | 5 sec | 10 sec | 15 sec | 20 sec |
| --- | --- | --- | --- | --- |
| 1 | 92 | 95 | 97 | 98 |
| 2 | 90 | 91 | 94 | 96 |
| 3 | 89 | 92 | 95 | 96 |
| 4 | 84 | 85 | 88 | 90 |
| 5 | 93 | 96 | 98 | 98 |
| 6 | 90 | 93 | 95 | 96 |
| 7 | 88 | 90 | 92 | 93 |
| 8 | 87 | 89 | 91 | 93 |

The results in Tables 2 and 3 reveal that the dehydrating agents 1 to 6 of the present invention are comparable to or superior to known dehydrating agents such as isopropanol and ethanol in the ability for dehydration.

We claim:

1. A method of dehydrating and drying an article having a surface moistened with residual water comprising immersing said article in a dehydrating agent selected from the group consisting of either of tetrafluoropropanol or pentafluoropropanol, and mixtures thereof, and drying the article after immersion.

2. A method of dehydrating and drying an article having a surface moistened with residual water comprising immersing the article in a dehydrating agent selected from the group consisting of either of tetrafluoropropanol or pentafluoropropanol, and mixtures thereof, in water and drying the article after immersion.

* * * * *